United States Patent Office 3,238,238
Patented Mar. 1, 1966

3,238,238
SELECTIVE OXIDATION OF ALIPHATIC HYDRO-
CARBONS TO ALCOHOLS IN PRESENCE OF
TERT-BUTYL BORATE
Laurence S. McNamara, South Plainfield, and Charles A.
Cohen, Westfield, N.J., assignors to Esso Research and
Engineering Company, a corporation of Delaware
No Drawing. Filed Apr. 25, 1960, Ser. No. 24,249
8 Claims. (Cl. 260—452)

This invention relates to selective oxidation of organic compounds. In particular, this invention relates to a process wherein an organic compound is contacted with an oxidizing gas containing molecular oxygen in the presence of a tertiary borate.

It is now known that an organic compound may be selectively oxidized in the presence of boric acid or an ester of boric acid and a primary alcohol so as to introduce a hydroxyl group into such compound which can be maintained as such during further oxidation of the reactant mass.

The presence of boric acid in the oxidation reaction mixture in amounts sufficient to esterify hydroxyl groups as they are formed has been found to render this group less susceptible to further oxidation thereby permitting, in one embodiment, a conversion of the feedstock to a monohydroxylated product, or, in other embodiments, introduction of additional hydroxylation of a monohydric alcohol to a glycol or other polyhydroxy compound.

The oxidation product may be recovered as a borate ester and hydrolyzed to free the ultimate product.

It has now been discovered that tertiary borates, e.g. tri-tert-butyl borate and tri-tert-amyl borate are surprisingly superior to boric acid and other boron-containing compounds for this purpose. Of these t-butyl borate is most preferred.

The term "other boron-containing compounds" is used herein to include other borate esters, e.g. trimethyl borate, wherein the carbon of the ester linkage is not bonded with a tertiary carbon atom, substituted boric acids, e.g. alkyl or aryl boric acids which may be represented by the formulae $R_2BOH$ and $RB(OH)_2$ wherein R is a hydrocarbon radical, and other boron compounds which generate boric acid upon contact with water, e.g. $B_2O_3$.

It has been found that when a borate ester of a tertiary alkanol, particularly tri-tert-butyl borate, is employed, the overall rate of reaction is surprisingly increased. The tertiary alkyl borates afford other advantages. Since they are soluble in hydrocarbons and other organic compounds, a homogeneous reaction mixture results. They are less corrosive than boric acid. They have advantages over the lower molecular weight borate esters in their higher boiling points, 175° C. and above, which permits the reaction to be carried out at atmospheric pressure. They are superior to other esters of comparable molecular weight in that they are themselves more resistive to oxidation.

In the instant process the compound to be hydroxylated is admixed with the tertiary borate either with or without an inert diluent so as to form a liquid reaction solution or mixture. The resulting mixture is maintained at a temperature in the range of about 100° to 300° C., preferably 130° to 180° C. while molecular oxygen is introduced to the mixture. The reaction may be effectively carried out at pressures in the range of 1 to 50 atmospheres. An oxidation catalyst may be employed with the reaction mixture.

The time of reaction is dependent upon the compound to be hydroxylated, the temperature of reaction employed, the oxygen partial pressure during reaction, and the degree of conversion desired.

The reaction may be carried out without the aid of an oxidation catalyst. However, it is within the scope of the invention to employ an oxidation catalyst such as metal-containing oxidation catalysts, e.g. compounds of manganese, cobalt, vanadium etc., and particularly the naphthenate, oleate, acetate, etc. compounds of such metals. When used, these are preferably employed in amounts of 0.001 to 0.1 mole of catalyst per mole of organic feedstock. If bromide catalysts are employed, e.g. ammonium bromide, manganese bromide, HBr, etc. it is preferred to employ about 0.5 to 2 wt. percent of the catalyst per mole of organic feedstock.

Diluents or solvents that may be suitably employed in the liquid reaction mixture include chlorobenzene, dichlorobenzene, bromobenzene, etc. Other inert diluents such as tetrachloroethane may also be used. In the absence of other diluents, the triborate may be used as the diluent.

The oxygen gas may be introduced in its undiluted form or it may be diluted with an inert gas such as nitrogen. Thus air may serve as the oxidant or an inert gas-oxygen mixture containing less or more oxygen than that normally found in air may be employed. Other inert gases may be substituted for nitrogen.

The amount of tertiary borate employed in this process may vary somewhat depending upon the feedstock and the end product desired. In general, the amount of tertiary borate employed should be in excess of the amount that would be stoichiometrically equivalent to the number of hydroxyl groups to be introduced. Since it is generally desirable to effect only partial conversion in a single pass operation (although recycle and multi-stage operation are within the scope of the invention) the amount of tertiary borate added to a reaction mixture will be generally less than stoichiometric requirements for 100% conversion. Thus, the amount of tertiary borate employed is advisedly in the range of about 0.01 to 1.0 or more, preferably 0.03 to 0.7 mole of the borate per mole of organic reactant being fed to the reactor.

The use of the higher portion of this range is particularly of interest when comparatively large quantities of inert diluent are employed.

It should be understood that 1 mole of a tertiary triborate, as a tri-ester of a tribasic acid wherein each acid group is esterified by a trialkyl carbinol, is considered as constituting three chemical equivalents.

The reaction may be carried out in steps. A single hydroxyl group may be introduced into an aliphatic or aromatic compound. In the presence of a tertiary borate under the conditions of reaction employed in the instant process the hydroxylated compound is transesterified to form a borate ester of the oxidized feedstock. This ester may then be oxidized either before or after separation from the reaction mixture to introduce additional hydroxyl groups in the presence of additional tertiary borate, which are in turn blocked from further oxidation.

The compounds which may be advantageously hydroxylated in the presence of the tertiary borates include by way of example $C_2$-$C_{30}$ saturated and unsaturated, cyclic and acyclic aliphatic hydrocarbons; alkylaryl and arylalkyl hydrocarbons, e.g. toluene, xylene, diisopropyl benzene, etc.; high molecular weight hydrocarbon polymers, e.g. polyethylene, polypropylene, butyl rubber, etc., and substituted hydrocarbons such as $C_2$ to $C_{30}$ alcohols, etc.

The following examples illustrate embodiments of the invention and are not to be construed as limiting the true scope of the invention as set forth in the claims.

EXAMPLE I

A 65 gram charge of the mixed isomers of xylene and 16 grams of tri-tert-butyl borate (0.61/0.07 mole ratio) are heated at vigorous reflux (137–139° C.) in the presence of 0.01 wt. percent cobalt (in the form of cobalt naphthenate). Air, at a rate of 200 cc./min., is passed through the reaction mixture for two hours. The crude product is washed with dilute $Na_2CO_3$ solution, separated and washed again with water. Analysis of the product and unreacted xylene mixture reveals a conversion of about 10 wt. percent of the xylene charge. The product contains a 2:1 ratio of methylbenzyl alcohols (tolylcarbinols) to aldehyde. Acids and phenols are not found in the product.

EXAMPLE II

Cyclododecane is employed as the feedstock and tri-tert-butyl borate is compared with boric acid. In each test the mole ratio of the boron containing compound to cyclododecane is 0.165/1.0. Air is employed as the oxidant and passed through the reaction mixture at an average rate of 250–270 cc./min. No catalyst is used.

A comparison of oxidation rates in the presence of the two boron-containing compounds is given in the following table:

Table I

COMPARISON OF OXIDATION RATES OF CYCLODODECANE IN PRESENCE OF BORIC ACID AND t-BUTYL BORATE

| Oxidation | Time (Hrs.) | Temp. (° C.) | Percent Conversion | Percent Selectivity to Alcohol |
|---|---|---|---|---|
| Tert-Butyl Borate | 2.00 | 155–160 | 20.6 | 77.5 |
| Tert-Butyl Borate | 2.08 | 155–160 | 22.2 | 77.5 |
| Boric Acid | 5.25 | 160 | 27.2 | 81.0 |
| Boric Acid | 6.75 | 160 | 21.4 | 83.0 |

EXAMPLE III

The procedure of Example II is repeated except that cyclooctene is employed as the feedstock. Cyclooctenol is recovered as the predominant product. High molecular weight polymers normally resulting from air oxidation of unsaturated cyclic compounds are not found in measurable quantities.

EXAMPLE IV

The procedure of Example II is repeated with n-heptane employed as the organic feedstock with tri-tert-amyl borate. The oxidation product is analyzed and found to contain a high selectivity to the $C_7$ monohydric alcohol.

EXAMPLE V

A $C_{13}$ monohydric alcohol is esterified by mixing such alcohol with $H_3BO_3$ and heptane and heating the resulting mixture for about 5 hours at reflux temperature, i.e. about 95°–98° C. The heptane solvent and excess alcohol are removed by distillation leaving the borate ester as residue. Of this residue about 3 moles of the ester are charged to a glass reaction vessel with about 1 mole of t-butyl borate and air is bubbled through the reaction for about 2 hours at a temperature of about 170° C.

After the oxidation is terminated, the reaction mixture is treated with methanol at reflux temperature, i.e. about 60°–65° C., to recover overhead a methyl borate-methanol mixture. The residue is distilled at a pressure of about 15 mm. Hg to recover a $C_{13}$ glycol, unreacted alcohol and some higher molecular weight product.

Analysis of the residue reveals about 35 weight percent of the alcohol has been converted. Of the converted amount, the selectivity to glycol is about 60%.

EXAMPLE VI

Cyclododecane is oxidized in the presence of tri-n-butyl borate and also in the presence of tri-tert-butyl borate. The oxidation is carried out at a temperature of about 160° C. The cyclododecane charge to the reaction is 0.3 mole in each operaton. The amount of boron containing compound charged to the reaction is 0.05 mole for the run with tri-n-butyl borate and for the run with tri-tert-butyl borate. The air flow to the reaction mixture is 270 cubic centimeters per minute for each operation. Air flow is terminated in each operation after 3½ hours. The crude product is hydrolyzed with $H_2O$ at about 90° C. After cooling diethyl ether is added and the aqueous layer is separated. The ether layer is washed once more with $H_2O$, dried and the ether removed by stripping at about 25° C. The product is analyzed. The results obtained are set forth in Table II.

Table II

COMPARISON OF OXIDATION OF CYCLODODECANE IN PRESENCE OF TRI-n-BUTYL BORATE AND TRI-TERT-BUTYL BORATE

| | Percent Conversion | Percent Selectivity to Cyclododecanol |
|---|---|---|
| Tri-n-butyl borate | 37.0 | 42 |
| Tri-tert-butyl borate | 46.4 | 62 |

Upon hydrolysis of the product it is also found that when tri-tert-butyl borate is employed quantitative recovery of tert-butyl alcohol is effected whereas hydrolysis of the product when tri-n-butyl borate is employed yields n-butyl alcohol contaminated with butyraldehyde.

Thus surprisingly it has been found that tertiary borates are superior to boric acid and other borate esters in the hydroxylation of organic compounds both as to rate of conversion and alcohol selectivity.

What is claimed is:

1. A process which comprises contacting an aliphatic hydrocarbon compound containing from 2 to 30 carbon atoms with an oxygen-containing gas in the presence of 0.01 to 1.0 mole of a borate ester of a tertiary alcohol selected from the group consisting of tri-tertiary-butyl borate and tri-tertiary-amyl borate at a temperature in the range of 100° to 300° C. thereby forming a borate ester of said compound.

2. A process in accordance with claim 1 wherein said temperature is in the range of 130° to 180° C.

3. A process in accordance with claim 1 wherein said process is carried out in the presence of catalytic amounts of a metal-containing oxidation catalyst.

4. A process in accordance with claim 1 wherein said oxygen-containing gas is air.

5. A process in accordance with claim 1 wherein said hydrocarbon is a saturated cyclic compound.

6. A process in accordance with claim 1 wherein said cyclic compound is cyclododecane.

7. A process in accordance with claim 1 wherein said hydrocarbon is an acyclic saturated hydrocarbon.

8. A process in accordance with claim 1 wherein 0.03 to 0.7 mole of said ester is employed per mole of said hydrocarbon and the temperature is maintained in the range of about 130° to 180° C.

References Cited by the Examiner

UNITED STATES PATENTS 1,947,989   2/1934   Hellthaler.

OTHER REFERENCES

Freidin: Chem. Abstracts 49:9264–65 (1955) (2 pages), 260–632.

LEON ZITVER, *Primary Examiner.*

CHARLES B. PARKER, *Examiner.*